(12) United States Patent
Ramboyong et al.

(10) Patent No.: US 7,470,125 B2
(45) Date of Patent: Dec. 30, 2008

(54) SYSTEM AND METHOD FOR TRAINING AND EVALUATING CREWMEMBERS OF A WEAPON SYSTEM IN A GUNNERY TRAINING RANGE

(75) Inventors: Lenard V. Ramboyong, South Riding, VA (US); Philip S. Zinser, Fredericksburg, VA (US); Paul W. Bachelder, Fairfax, VA (US); Charles S. Thomas, Fredericksburg, VA (US); Mark A. Roberts, Fredericksburg, VA (US); Edwin L. Duncan, Fredericksburg, VA (US); Lawrence D. Clark, Lignum, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 588 days.

(21) Appl. No.: 11/057,787

(22) Filed: Feb. 15, 2005

(65) Prior Publication Data

US 2006/0183084 A1    Aug. 17, 2006

(51) Int. Cl.
*F41A 33/00*    (2006.01)

(52) U.S. Cl. ..................................................... 434/11

(58) Field of Classification Search .................. 434/11
See application file for complete search history.

(56) References Cited

U.S. PATENT DOCUMENTS

| | | | | |
|---|---|---|---|---|
| 6,254,394 | B1 * | 7/2001 | Draper et al. | 434/11 |
| 6,283,756 | B1 * | 9/2001 | Danckwerth et al. | 434/11 |
| 6,386,879 | B1 * | 5/2002 | Varshneya et al. | 434/16 |
| 6,899,539 | B1 * | 5/2005 | Stallman et al. | 434/11 |
| 7,265,663 | B2 * | 9/2007 | Steele | 340/531 |
| 2002/0196142 | A1 * | 12/2002 | Wang et al. | 340/541 |

* cited by examiner

*Primary Examiner*—Cameron Saadat
(74) *Attorney, Agent, or Firm*—Andrew Romero; John Raubitschek (57) ABSTRACT

The present invention provides a multi-split screen image with audio feed to document the training engagement. The multi video image combines an over-watch thermal image, the Loader's actions, the Gunner's actions, and the imagery from the vehicle's thermal imaging system. The audio track documents the communication within the vehicle and between the vehicle and the control tower. Further, the present invention provides a tower control module that also provides surveillance video over the firing range. Until the present invention no other gunnery-training device transmitted and displayed its imagery and audio in this manner.

7 Claims, 6 Drawing Sheets

SYSTEM AND METHOD FOR TRAINING AND EVALUATING CREWMEMBERS OF A WEAPON SYSTEM IN A GUNNERY TRAINING RANGE

GOVERNMENT INTEREST

The invention described herein may be manufactured, used, sold, imported, and/or licensed by or for the Government of the United States of America.

FIELD OF INTEREST

The invention relates to providing accurate records of a weapon system training crew's actions. More particularly, it relates to integrating vehicle and tower mounted imaging sensors, which act as performance evaluators to accurately and precisely grade a military field operation.

BACKGROUND OF THE INVENTION

The crewmembers of a weapon system, such as an US Army M1A1 Abrams Main Battle tank, must demonstrate their target acquisition and engagement skills during periodic live-fire gunnery training exercises. A typical Army gunnery training range is 1-3 kilometers in length by 500 meters wide. At the beginning of the range is a range control/observation tower. There are one or more roads, or firing lanes, on the range with one or more Battle Positions from where the vehicles engage targets.

A tank crew is scored by how effectively and efficiently they can identify, prioritize, and engage tank-sized and personnel-sized pop-up targets from firing positions. Currently, the Army employs the Remoted Target System (RETS) or the Enhanced Remoted Target System (E-RETS) to actuate pop-up targets on the training range via computer-control. When munitions or debris strike a target, impact sensors reset the target into a defilade position and the computer registers a "hit". The evaluators use the number of rounds fired, target hits and misses, and the time it takes for the crew to acquire and engage the targets as metrics to critique the exercise. The tank crew is expected to perform under most weather conditions, and is penalized for not following approved Army training doctrine.

The accuracy of the tank crew's score and the quality of the post-exercise review, or After-Action Review (AAR), is directly dependent upon the tools used to monitor and document the exercise. The evaluators monitor the training exercise from elevated observation towers located at one end of a training range. They document the radio communications and often record how the tank engages the targets using imaging systems. Currently, these tools are crude and inadequate to perform a meaningful AAR.

The evaluators communicate with the tank via an Army Single Channel Ground to Air Radio System (SINCGARS). They can also monitor the communications between the tank's crewmembers using the same system. To record the audio communications with the tank, evaluators place an analog cassette tape recorder against the radio's speaker. The quality of the recording is often poor because the cassette tape recorder records ambient noise and conversations in addition to the radio communications. This arcane audio recording method is one of the tools used in the AAR process. The disadvantages of this method are the poor audio quality and the inherent limitations associated with using an audio record to recreate a dynamic action sequence.

The evaluators use visual tools to verify the safety conditions on the training range and the accuracy of the crew's marksmanship. They observe the exercise during the day using their unaided eye, high-powered binoculars, or Army issued $1^{st}$ Generation thermal imaging systems. These thermal imaging systems allow the evaluators to see through some fog and smoke conditions in addition to operating in total darkness. Standard $1^{st}$ Generation thermal imagers do not offer a video line output. They must be modified in order to do so. Therefore, unless the systems are modified, the imagery from the systems cannot be recorded to document the exercise. A visual verification of the crew's marksmanship is necessary to validate "hits" scored by the RETS (or E-RETS). The system does not always accurately score the "hits". If a tank round falls short of the target, showering debris can strike the target and register a strike. Conversely a round can glance off the target and not be registered. A visual verification by the evaluator can validate the target system's scores. Although the use of imaging systems is useful, the manner in which they are employed is crude. These systems are typically mounted on tripods and manually traversed by an operator. When the RETS actuates a target, the operator is expected to visually find the target on the range, which can be an area as large as one million square meters, then traverse the imager to the target in time to see the round strike it. One can imagine how difficult and ineffective this task can be.

The current audio and video tools used by evaluators do not provide the meaningful feedback tank crews need to improve their performance. The audio record makes it difficult to reference the crew's communications with their actions. This "audio only" record creates an opportunity for a crew to shortcut approved operating procedures within the vehicle. They can say one thing while doing something else. The video record, if there is one, is only as good as the operator who operates the imaging sensor. If the operator does not verify the point-of-impact of the round, then the video record is useless. This record is used to substantiate the RETS-generated score. Without the video record the accuracy of the score can be questioned.

Some Army training ranges use one system to better document the actions of the training vehicle. The Deployable Range Training Safety System (DRTSS) by EFW Inc., Fort Worth, Tex. combines a Through-Sight Video (TSV) device in conjunction with a thermal imager. The TSV is a device that mounts to the M1A1 Commander's optical display and captures the imagery he sees. This imagery is identical to the tank Gunner's imagery, hence offering the evaluators the ability to see the battlefield through the eyes of the vehicle crew. The TSV signal is recorded to a S-VHS VCR mounted on the vehicle in addition to being transmitted to the range's observation tower. A computer-controlled thermal imager is emplaced on the training range to provide another perspective of the battlefield. The DRTSS displays the TSV and thermal imaging system on two separate video monitors. There are several limitations to this system.

Therefore, there needs to be a more efficient and better quality manner of assessing a weapon system training crew's performance. The present invention addresses this need.

SUMMARY OF THE INVENTION

Accordingly, one object of the present invention is to provide a more efficient and better quality manner of assessing a weapon system training crew's performance.

This and other objects of the present invention are by providing a multi-split screen image with audio to document the training engagement. The four-in-one video image combines an over-watch thermal image, the Loader's actions, the Gunner's actions, and the imagery from the vehicle's thermal imaging system. The audio track documents the communication within the vehicle and between the vehicle and the control tower. Further, the present invention provides a tower control module that also provides surveillance video over the firing range.

BRIEF DESCRIPTION OF THE DRAWINGS

These and other objects of the invention will become readily apparent in light of the Detailed Description Of The Invention and the attached drawings wherein.

DETAILED DESCRIPTION OF THE INVENTION

Figure 1:
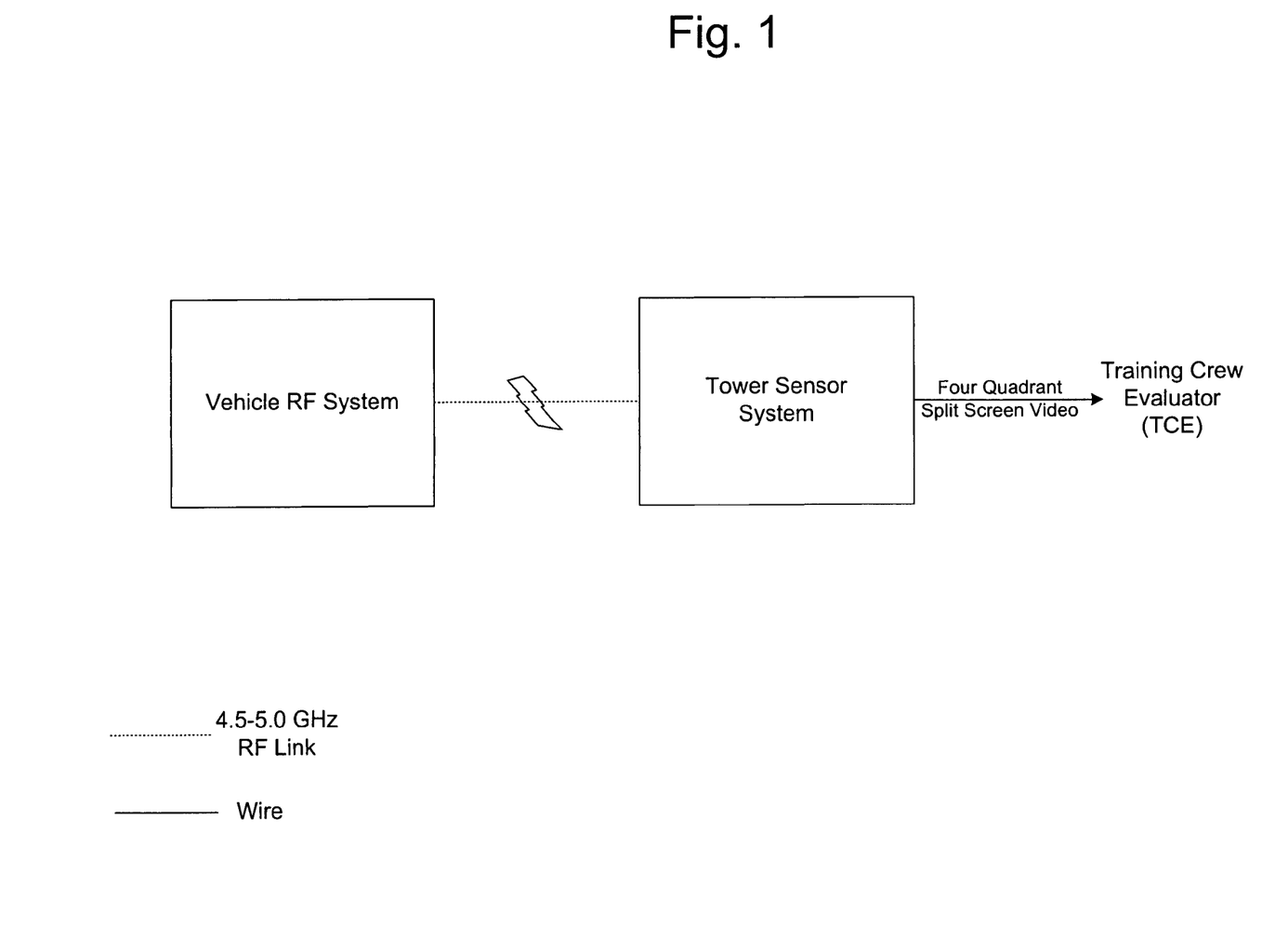
FIG. 1 is a general block diagram of the present invention.

As shown by the general overview of the present invention in FIG. 1, the system of the present invention is divided into two primary subsystems the Vehicle RF System (VRFS) and the Tower Sensor System (TSS). These two primary subsystems then feed into video and audio monitors that comprise the user end or evaluators end of the invention.

Figure 2:
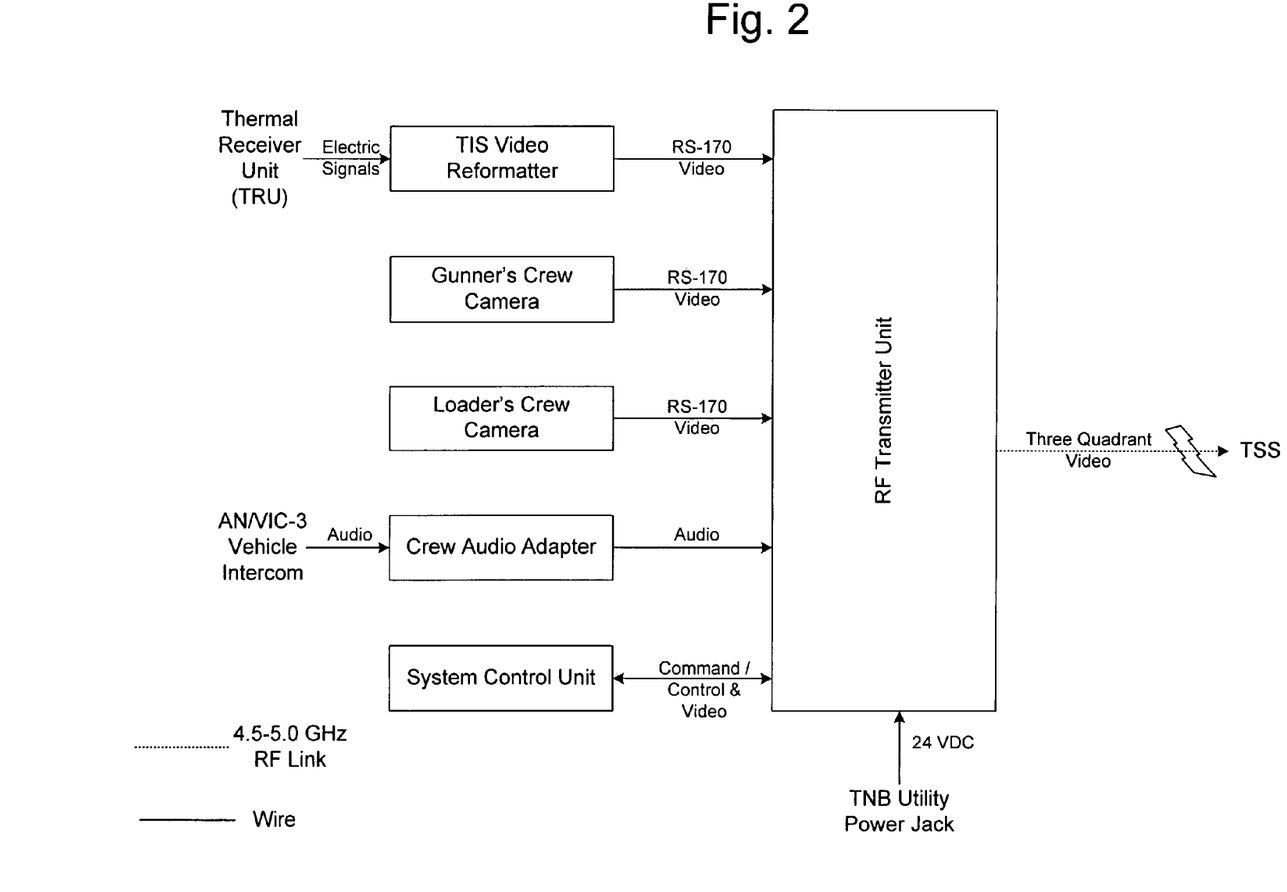
FIG. 2 is a block diagram of the Vehicle RF System of the present invention that is installed on the weapon system.

As shown in FIG. 2, the VRFS encompasses all of the componentry installed onto the host vehicle. A system has been designed and developed for the US Army M1A1 Abrams tank. Feasibility studies of the M2A2 Bradley Fighting Vehicle indicate a similarly designed system would be compatible. The VRFS is comprised of the RF Transmitter Unit (TU), Transmitter cable, two low-light cameras, Thermal Imaging System (TIS) Video Reformatter (VR), the System Control Unit (SCU), Intercom adapter, and a two-piece cable assembly. The two cameras, which use illuminating Light Emitting Diodes (LEDs) to improve its performance under very low-light conditions, are mounted to the inside surfaces of the turret to capture this information. One camera is mounted behind the Loader to monitor the performance of his duties. The other camera is mounted over the shoulder of the Gunner to monitor his actions. Once these cameras are mounted and positioned inside the turret, the crew does not have to operate them during their training exercise.

The TU is the core of the VRFS. In addition to distributing power to the other components, the TU combines three video signals into a quadrant-split screen and ties into the vehicle's radio system. The unit then transmits this combined, single audio and video signal to the training range's observation tower via microwave RF transmission. Because the cargo capacity on the tank is limited, the TU is designed to hang on the outside bars of the turret's bustle rack. This eliminates the need for soldiers to unpack any of their gear to accommodate the unit. Furthermore, the unit relies on two captive tee-handles to secure it in place. These tee-handles eliminate the need for additional tools and can be operated with and without Army issue artic mitts. The TU electronics are protected from excessive shock and vibration affects through the use of wire rope isolators. The transmitting antenna is secured to the end of a spring-mounted extension assembly. This extension prevents the antenna from being obscured by cargo in the bustle rack or auxiliary equipment installed on the vehicle. The spring-mount assembly also protects the antenna against side load impacts. The TU has two carrying handles on the sides of the unit to facilitate transport.

Installation of the VRFS components is accomplished with the System Control Unit (SCU). The SCU is used to verify the position the two low-light cameras, and confirm the proper operation of the TIS Video Reformatter. The user can transmit one full screen video signal, a quadrant-split screen of the three video signals, or nothing at all. The features of the SCU include a 2.5 in. LCD, a five position rotary knob, and a momentary push button with button guard. The display is used to view the video while positioning the cameras. The rotary knob and push button work in conjunction to select the desired video output format. The user can turn the knob to the desired output format, and press the button to execute the selection. The two-step selection procedure and button guard prevent accidental selection of an output format.

The lane select toggle switch on the Transmitter Unit (TU) is the second way the operator can control the VRFS. This switch is an intentionally simple yet effective feature to allow flexibility to the system. It switches between two RF frequencies that are assigned to each firing lane on a range. In the event a vehicle's lane assignment changes, the simple flip of a switch changes the vehicle's transmit frequency.

The TU is a 25 lb assembly that hangs on the outside of the vehicle's bustle rack. This approach is novel because previous designs mounted inside the bustle rack. This required the crewmen to relocate existing equipment to make room for a training device. Relocating equipment not only takes time but in some cases is not possible. This mounting scheme eliminates these problems. Furthermore, the assembly secures to the bustle rack using two captive hooks and tee-handles. This feature is tool-less and increases installation speed.

Army gunnery training exercises are dynamic by nature. Although there is a general schedule of events, the participants must be flexible to changes to their firing sequence and the lane they are firing on. Since there are typically two firing lanes per range, the TU is configured to handle either lane assignment. The TU is capable of transmitting data on one of eight channels. Two Frequency Select knobs, labeled Left Lane and Right Lane, are hidden behind a secured panel on the front of the TU. These knobs are used to set the two frequencies available to the Lane Select toggle switch located on the top of the unit. The lane(s) on the left side of the control tower is assigned one frequency and the lane(s) on the right side is assigned another. The Lane Select switch, labeled L and R, determines which frequency the unit transmits on. If a last minute change to a vehicle's lane assignment occurs, the vehicle crew merely changes the Lane Select switch from L to R, or vice versa, to accommodate the change.

The VRFS is easy to use, and has limited impact on the Standard Operating Procedures (SOP) of the tank's crew. Power to the TU is drawn from the vehicle's Turret Network Box (TNB) Auxiliary Power receptacle. The unit is operational and transmitting as long as this power receptacle's circuit breaker is closed. Once the VRFS is properly installed on the vehicle, this single switch operation reduces the training crew's required operation of the system during their training exercise.

Figure 3:
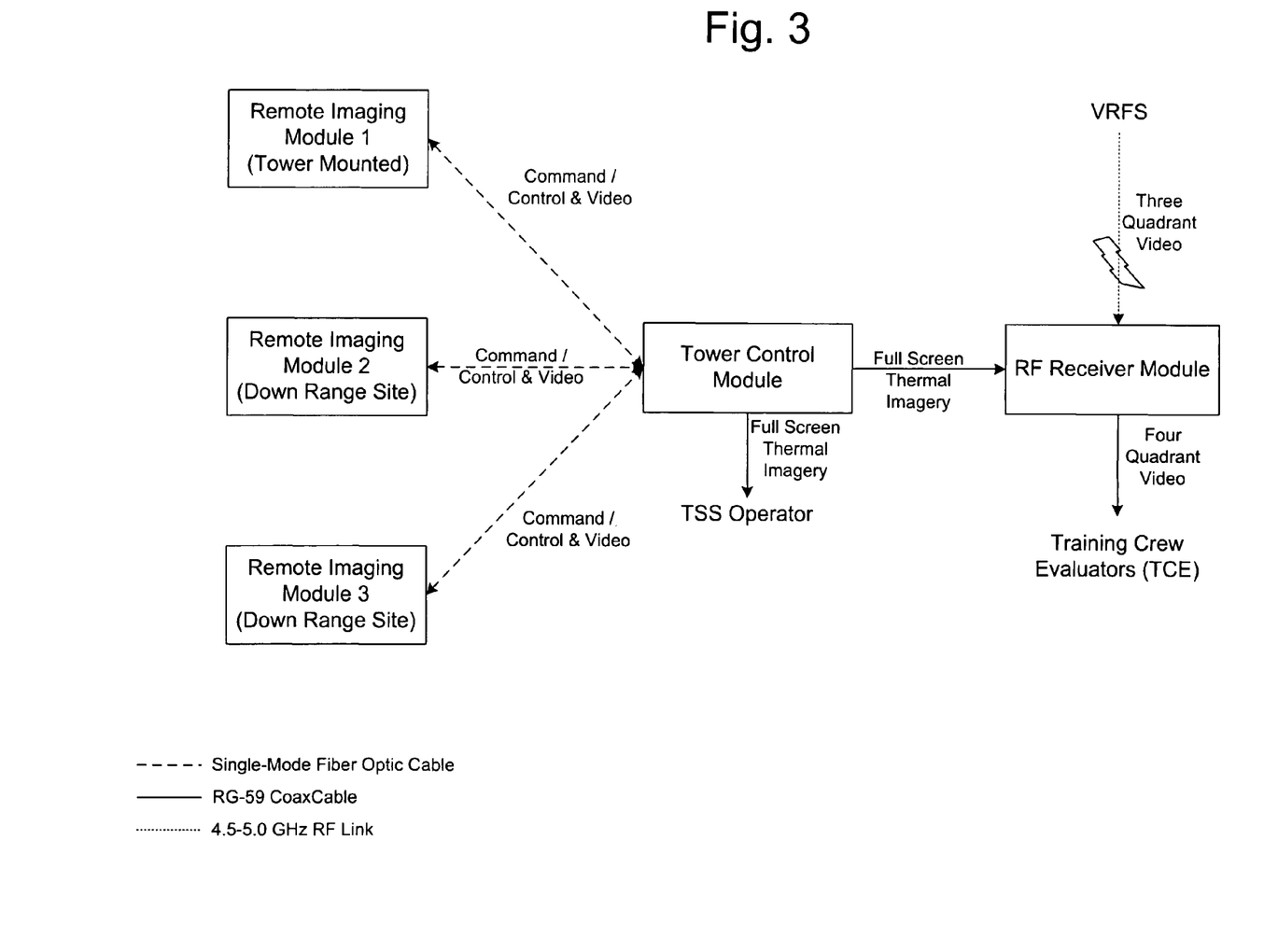
FIG. 3 is a block diagram of the tower sensor system.

As shown in FIG. 3, the Tower Receiver Module (TRM) (marked as RF receiver module) is the RF receiver module for the VRFS. The module contains at least one receiver to support one training range. On multi-lane ranges at least one receiver is dedicated for the right lane and at least one receiver for the left lane. The VRFS transmits audio and video signals on two or more frequencies. One slotted wave-guide antennae operating in the 4.5-5 MHz band receives all of the transmissions from the units. A frequency splitter separates the transmission into its component frequencies and the receivers demodulate the signals. When more than two frequencies are used by the VRFS, then dedicated receivers are added to the TRM to accept the additional frequencies. The video signal from the TCM is combined with the right and left lane TRM video signals respectfully to complete the fourth quadrant of the split-screen image. The resultant audio and video are displayed on monitors equipped with VCRs. Each VRFS frequency is displayed on its own monitor. The evaluators can record the footage from the monitors in real-time to use during the AAR.

The TRM also receives signals from the Tower Control Module through which signals from the Tower Sensor System are fed. This is shown on the left side of FIG. 3.

Figure 4:
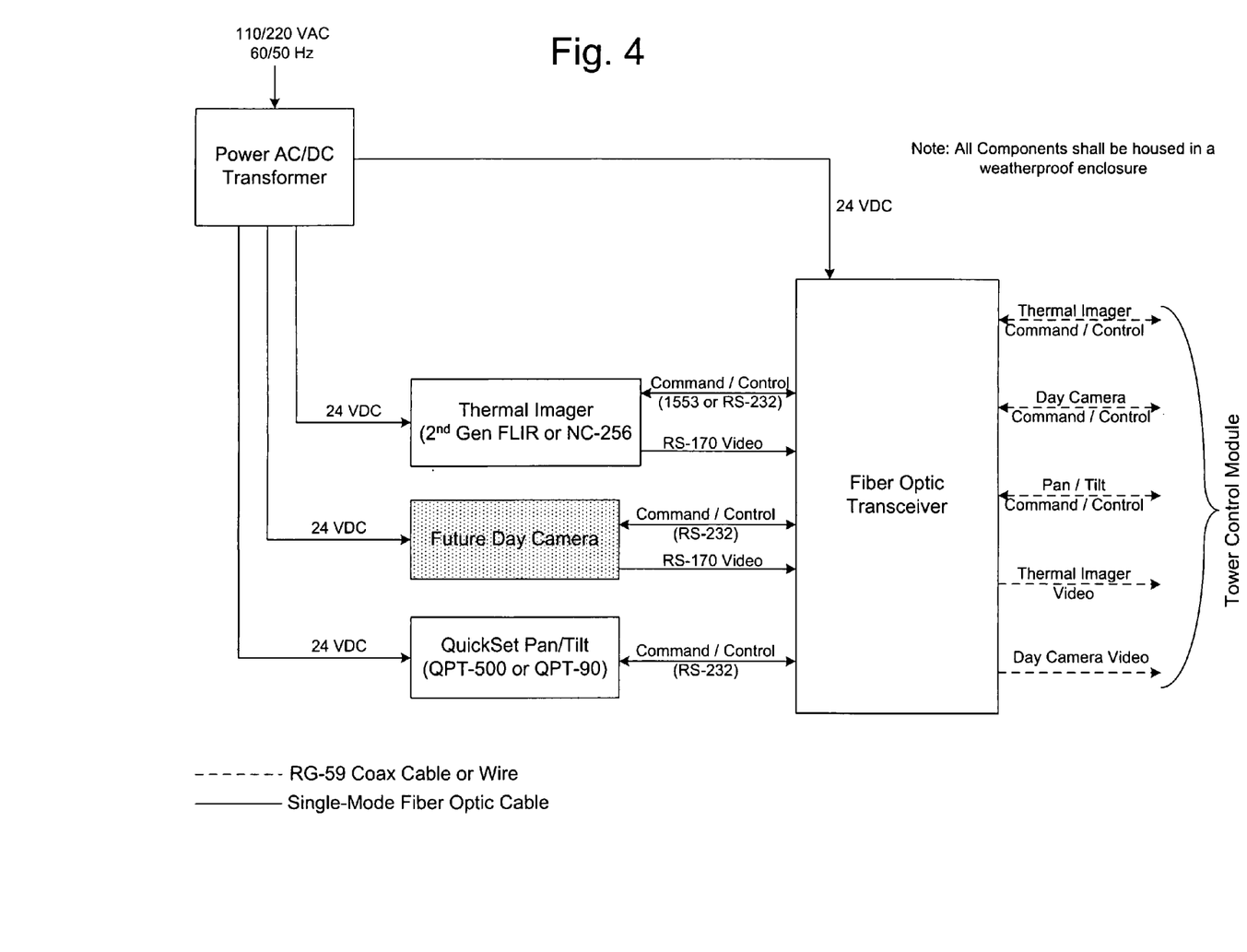
FIG. 4 is a block diagram of the tower sensor system remote imaging module according to the present invention.

As shown in FIG. 4, the Tower Sensor System (TSS) encompasses all of the componentry installed in the range control/observation tower and remote locations down range. The TSS is composed of three modules. FIG. 4 only shows one module comprised of a thermal imager, future day camera and a pan/tilt set. This module is fed through a fiber optic transceiver to the Tower Control Module (TCM). The TCM primarily controls the thermal imager(s). The Remote Imaging Module (RIM) is the actual thermal imager, pan/tilt, and ancillary equipment mounted either on the control tower or at locations down range. The Tower Receiver Module (TRM) is the RF receiver link to the VRFS. These modules work in concert to produce the quadrant-split screen videos used by the evaluators. Although the system is modular, the TSS must have at least one TCM, RIM, and TRM to produce a complete four-quadrant video. Up to four RIMs can be controlled by one TCM. Multiple RIMS are used to increase the total video coverage of the training range.

Figure 5:
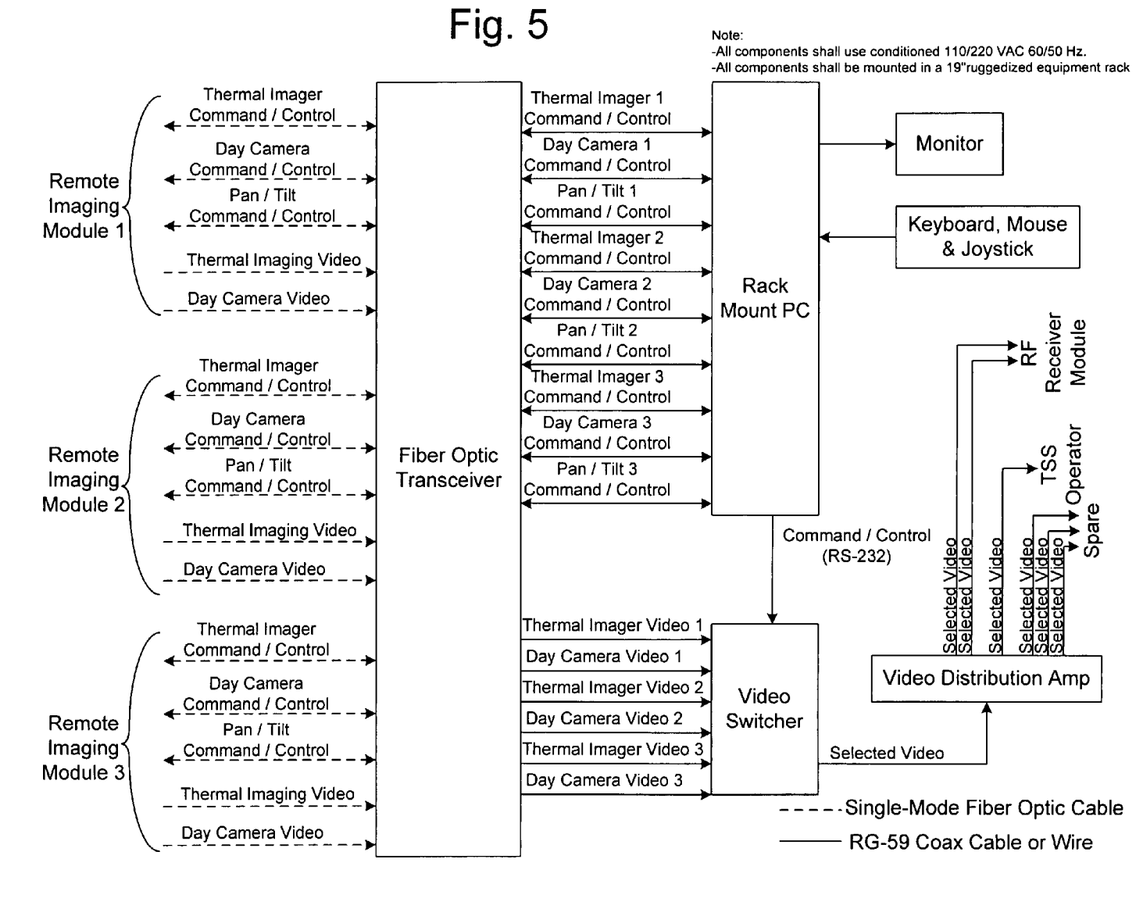
FIG. 5 is a block diagram of the tower control module.

FIG. 5 shows the RIMs in more detail. The TCM is the module that controls the RIMs. The core of this module is a commercially available Pentium-based computer in either a desktop or 19" rack mounted configuration running a Windows operating system. The TCM operator uses the Tower Sensor System (TSS), a custom designed computer program, to command the thermal imager(s) to preprogrammed positions on the range and adjust the thermal imager's control settings. Although the module can control multiple RIMs, it can only control one RIM at a time. Therefore the TCMs output video automatically switches between the multiple RIMs to display the video imagery of the RIM being controlled. Other components of the TCM include a multi-channel fiber optic component and power supply. The fiber optic equipment sends and receives command and control information from one or more RIMs. The power supply provides the necessary power to all of the TCM components.

The TSS software package is a custom designed program that resides in the TCM. Its purpose is to control a RIM and work in coordination with the RETS. Prior to a training exercise a set of target scenarios is developed that meets Army training requirements. These scenarios identify which targets a training crew will engage during their exercise. Operators can manually input these scenarios into the RETS and then execute the target sequence upon command. Similarly operators can manually input these scenarios into the TSS program. When a training crew executes a target scenario, a set of buttons representing the targets is displayed on the computer monitor.

The TSS operator can use either a joystick or mouse to select the target button he wants to view. The RIM (if there are more than one), which corresponds to the respective target, will slew to the preprogrammed location on the range and adjust the thermal imager to preprogrammed settings to create a clear image. The advantage of the TSS to previously employed imaging systems is the fact that it is computer controlled and programmable. In the past an operator would manually slew the imager to positions on the range. Often times the operator would hone in on the target after the tank has engaged it, thereby missing the point of impact of the munitions. If he were fortunate to locate the target in time, he would then have to manually change the imager's control settings (i.e. field-of-view, focus, polarity, brightness, and contrast, etc.) to optimize the picture quality. With the TSS the entire target positions on the range and their respective optimum thermal imager settings are preset. The operator's graphical user interface (GUI) presents him with only the targets assigned to the target scenario so he is not overburdened with too many target options. He can quickly switch between the possible targets and be confident that the imager is accurately slewing to the targets and displaying clear images. If the program is controlling multiple RIMs, it switches the TCM video output to the RIM being controlled.

As stated previously, the RIM encompasses a high-performance thermal imager, high-accuracy pan/tilt unit, and Interface Unit (IU). The thermal imager and pan/tilt unit are commercially available components. They are designed to withstand the rigors of the Army's diverse environmental conditions. They accept command data via a RS-242/422 protocol. The IU is the power distribution and command/control interface between the TCM and RIM.

The RIM achieves its flexible connectivity to the TCM via a fiber optic link. The fiber optic connection is the only consideration in determining the distance limitation between the RIM and TCM. The only inputs to the RIM are local power (110/220 VAC or 12-24 VDC) and the fiber optic connection from the TCM. Power to the RIM can be controlled remotely from the TCM.

Figure 6:
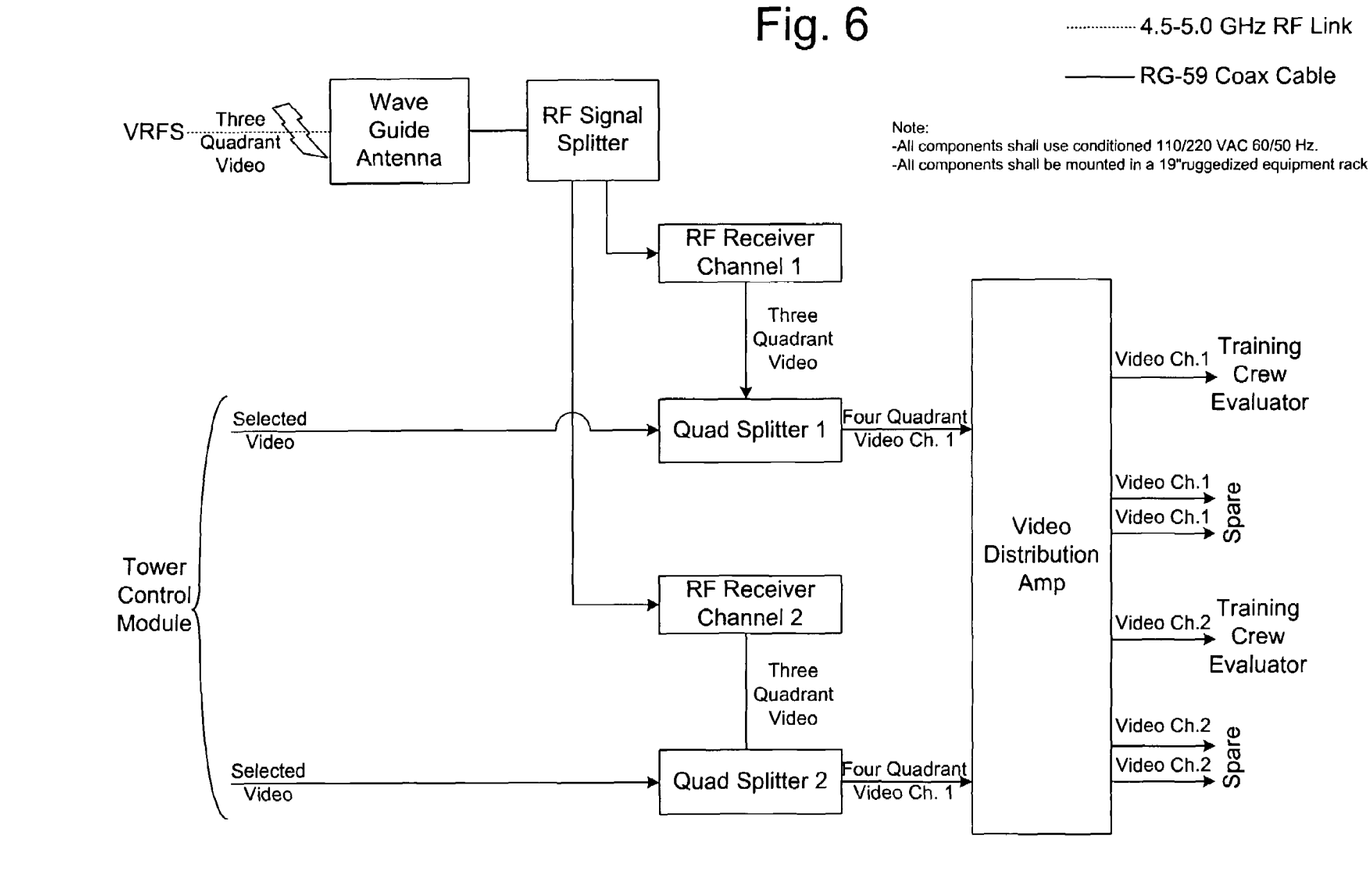
FIG. 6 is a block diagram of the tower sensor system RF receiver module.

FIG. 6 shows how the TCM and the VRFS inputs are fed to the training crew evaluators. From the VRFS, the inputs are sent through an RF splitter to two receiver channels that, in turn, feed into one of two quad splitters. The TCM input is fed, along with the VRFS input, through the one of two of the quad splitters to a video distribution amp. Ultimately, the collective signals are sent to the training crew evaluator's monitors and audio equipment for evaluation.

The most novel idea associated with the present invention is the use of a quad-split screen image with audio to document the training engagement. The four-in-one video image combines an over-watch thermal image, the Loader's actions, the Gunner's actions, and the imagery from the vehicle's thermal imaging system. The included audio track documents the communication within the vehicle and between the vehicle and the control tower. Until the present invention no other gunnery-training device transmitted and displayed its imagery and audio in this manner.

The use of low-light cameras to document the actions of the Loader and Gunner inside the vehicle is also new. Previously, there was no way to verify the actions of the crewmen within the vehicle during training. The addition of these cameras allows the evaluators to ensure the approved Army doctrine is being performed.

The Thermal Imaging Sensor (TIS) Video Reformatter is unique because it is the only device available that can electronically interface with the M1A1 TIS and provides an RS-170 video signal. Previous attempts to capture the TIS thermal imagery required mounting an optical device on either the Gunner's or Commander's eyepiece or modifying the optical path of the TIS. The disadvantages to these methods are the required installation time, modification of the vehicle's imaging system, altering the Gunner's or Commander's interface with their eyepiece, and the partial capture of the thermal imager. The TIS Video Reformatter does not alter the crewman's interface to the vehicle in any way and captures the full thermal imagery.

Communications with the tank have been documented using analog tape recorders in the past. The Intercom adapter of the present invention is a y-shaped cable assembly that connects between a crewman's CVC helmet and the vehicle's intercom box. The cable enables the Vehicle RF System (VRFS) to clearly capture the crewman's communications with no impact to his operations.

The VRFS is designed with limited operator interaction during the actual training engagement. The system only has two modes On and Off. The system is turned on by the circuit breaker for the Auxiliary Receptacle on the Turret Network Box (TNB). When the system is powered it begins to transmit. There is no other buttons required to transmit the video. This limited interaction ensures the use of the system does not alter the crew's Standard Operating Procedures (SOP). This also implies the crewmen require very limited training The Tower Sensor System (TSS) software is custom designed for the present invention. It controls multiple thermal imagers and pan/tilt units. The program stores optimized imager settings for each target on a defined gunnery range. The user can then customize a list of target sets he will be using during their training exercise.

The present invention gives evaluators the necessary tools to ensure gunnery training exercises are conducted safely and the crew's actions are evaluated accurately. Although it was intended to support US Army M1 Abrams tanks and M2 Bradley Fighting Vehicles, it can be applied to several other Army tanks and personnel carriers. The system integrates one audio source and four video sources to generate one composite video image divided into four quadrants. This composite video allows evaluators to simultaneously observe the crew's actions inside the training vehicle, listen to their radio communications, and visually verify the RETS generated score in real-time. This live video signal can be recorded for the AAR using an analog or digital videocassette recorder. This system is modular, configurable or customizable, and quick and easy to install. It is simple to operate, provides immediate feedback to the soldiers, and does not impede or alter the training crew's standard operating procedures.

The new features and advantages identified herein are based on the design intent of maximizing functionality and capability, minimizing installation time and effort, minimizing constant operator control and minimizing negative impacts to the operational procedure of the training crew.

The ability to watch the crew's actions inside of the turret in real-time is a tremendous tool for the evaluators. It allows them to ensure the crew is following proper operational and safety procedures, and provide accurate and precise feedback to the inadequacies of the crew's overall performance.

The TSV-like device used by the present invention is an improvement to previously fielded devices. The TIS Video Reformatter is a device designed, built, and sold by PEI Electronics Inc., Huntsville, Ala. As the name implies the Reformatter reformats electrical signals available from the tank's thermal imager, the TIS, into a RS-170 NTSC compliant video signal. It can also display the range and reticle symbols. The Reformatter is an electrical interface with the TIS, therefore it does not impede or alter the crew's interaction with their vehicle systems during the exercise.

What is claimed is:

1. A system to permit training exercise evaluators in an observation tower monitoring a live-fire exercise of a combat vehicle on a gunnery training range to hear audio communications within the combat vehicle and to observe video imagery both of the combat vehicle's crew and the range's pop-up targets in order to prevent the crew from shortcutting approved operating procedures within the vehicle and to confirm that target hits are accurately scored, comprising:
   a tower receiver module having a pair of inputs and an output;
   a vehicle radio frequency system mounted to the vehicle and connected by a microwave radio frequency link to one of the inputs of the tower receiver module for inputting from the vehicle to the tower receiver module three quadrant video with an audio signal, including video of the actions of the vehicle crew's gunner and loader;
   a thermal imaging module mounted in the tower;
   at least one thermal imaging module located down range from the tower,
   the thermal imaging modules providing surveillance of the targets;
   a tower control module connected between the other input of the tower receiver module and the outputs of the thermal imaging modules for inputting full screen video imagery from the thermal imaging modules to the tower receiver module; and
   a monitoring system connected to the output of the tower receiver module for receiving four-quadrant video with an audio signal from the tower receiver module for use by the training exercise evaluators, the four-quadrant video combining the video from the vehicle and the video imagery from the thermal imaging modules.

2. The system recited in claim 1 wherein the vehicle radio frequency system includes:
   a radio frequency transmitter unit.

3. The system recited in claim 1 wherein the vehicle radio frequency system includes:
   at least two low-light cameras.

4. The system recited in claim 1 wherein the vehicle radio frequency system includes:
   a thermal imaging system video reformatter.

5. The system recited in claim 1 wherein the vehicle radio frequency system includes:
   a system control unit.

6. A system to permit training exercise evaluators in an observation tower monitoring a live-fire exercise of a combat vehicle on a gunnery training range to hear audio communications within the combat vehicle and to observe video imagery both of the combat vehicle's crew and the range's pop-up targets in order to prevent the crew from shortcutting approved operating procedures within the vehicle and to confirm that target hits are accurately scored, comprising:
   a tower receiver module having a pair of inputs and an output;
   a vehicle radio frequency system mounted to the vehicle and connected by a microwave radio frequency link to one of the inputs of the tower receiver module for inputting from the vehicle to the tower receiver module three quadrant video with an audio signal, including video of the actions of the vehicle crew's gunner and loader,
   wherein the vehicle radio frequency system has a radio frequency transmitter unit, at least two low-light cameras, a thermal imaging system video reformatter, and a system control unit, and wherein inputs from the cameras, the thermal imaging system video reformatter, and the system control unit are fed into the radio frequency transmitter unit;
   a thermal imaging module mounted in the tower;
   at least one thermal imaging module located down range from the tower, the thermal imaging modules providing surveillance of the targets;

a tower control module connected between the other input of the tower receiver module and the outputs of the thermal imaging modules for inputting full screen video imagery from the thermal imaging modules to the tower receiver module; and a monitoring system connected to the output of the tower receiver module for receiving four-quadrant video with an audio signal from the tower receiver module for use by the training exercise evaluators, the four-quadrant video combining the video from the vehicle and the video imagery from the thermal imaging modules.

7. A method to permit training exercise evaluators in an observation tower monitoring a live-fire exercise of a combat vehicle on a gunnery training range to hear audio communications within the combat vehicle and to observe video imagery both of the combat vehicle's crew and the range's pop-up targets in order to prevent the crew from shortcutting approved operating procedures within the vehicle and to confirm that target hits are accurately scored, comprising the steps of:

inputting to a tower receiver module from a vehicle radio frequency system mounted to the vehicle, three quadrant video with an audio signal, including video of the actions of the vehicle crew's gunner and loader;

inputting to the tower receiver module by way of a tower control module full screen video imagery from thermal imaging modules surveilling the targets; and outputting from the tower receiver module to a monitoring system four quadrant video with an audio signal that combines the video from the vehicle and the video imagery from the thermal imaging modules.

* * * * *